United States Patent [19]

Hubertus et al.

[11] Patent Number: 4,768,141
[45] Date of Patent: Aug. 30, 1988

[54] D.C.-A.C. CONVERTER HAVING AN ASYMMETRIC HALF-BRIDGE CIRCUIT

[76] Inventors: Guido Hubertus, Portlandstrasse 20, D-6500, Mainz; Freidrich-Werner Thomas, Schwarzwaldweg 2, D-6460, Gelnhausen 2; Wolfgang Sperzel, Heimatfriedergasse 3, D-6560, Gelnhausen-Haile; Johann Stürmer, Pestalozzistrasse 8, D-6465, Freigericht 1, all of Fed. Rep. of Germany

[21] Appl. No.: 7,404

[22] Filed: Jan. 27, 1987

[30] Foreign Application Priority Data

Feb. 1, 1986 [DE] Fed. Rep. of Germany ....... 3603071

[51] Int. Cl.$^4$ ............................................ H02M 3/335
[52] U.S. Cl. ....................................... 363/16; 363/56; 363/20; 363/97
[58] Field of Search ................. 363/16, 17, 56, 97–98, 363/131–132, 20–21

[56] References Cited

U.S. PATENT DOCUMENTS 4,585,986  4/1986  Dyer .................................. 363/17 X
4,672,517  6/1987  Mandelcorn ....................... 363/17 X

FOREIGN PATENT DOCUMENTS 3316281  11/1984  Fed. Rep. of Germany .
0063976   4/1984  Japan ......................................... 363/16
59-17869  4/1984  Japan .

OTHER PUBLICATIONS

German Patent Office search report dated Aug. 28, 1986, [for German Patent Application P 3603 071.6].
"A Regulated DC-DC Voltage Source Converter Using a High Frequency Link", V. T. Ranganathan, Phoivos D. Ziogas and Victor R. Stefanovic, *IEEE Transactions on Industry Applications*, vol. IA–IB, No. 3, May/Jun. 1982, pp. 279–287.

Primary Examiner—Peter S. Wong
Attorney, Agent, or Firm—Davis Hoxie Faithfull & Hapgood

[57] ABSTRACT

The invention relates to a d.c.-a.c. converter with an asymmetric half-bridge circuit (1) that has an energy-storing component (6). The controllable switching means (2, 5) of the asymmetric half-bridge circuit (1) are driven by means of phase-shifted control pulses, the control pulses partly overlapping in time. The pulse width of the phase-shifted control pulses is substantially 180 electrical degrees.

21 Claims, 4 Drawing Sheets

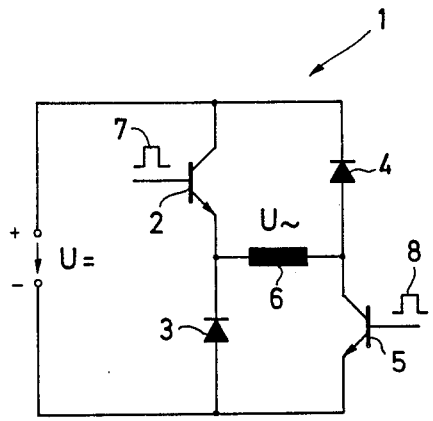
FIG.1 PRIOR ART
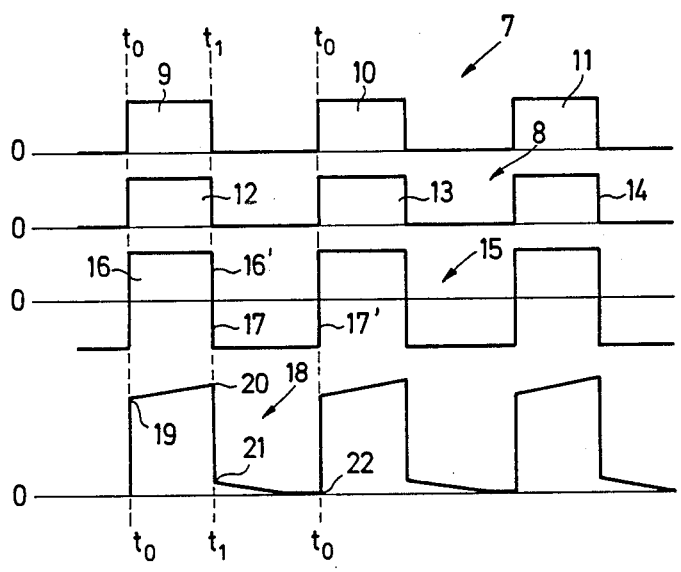
FIG.2a
FIG.2b
FIG.2c
FIG.2d

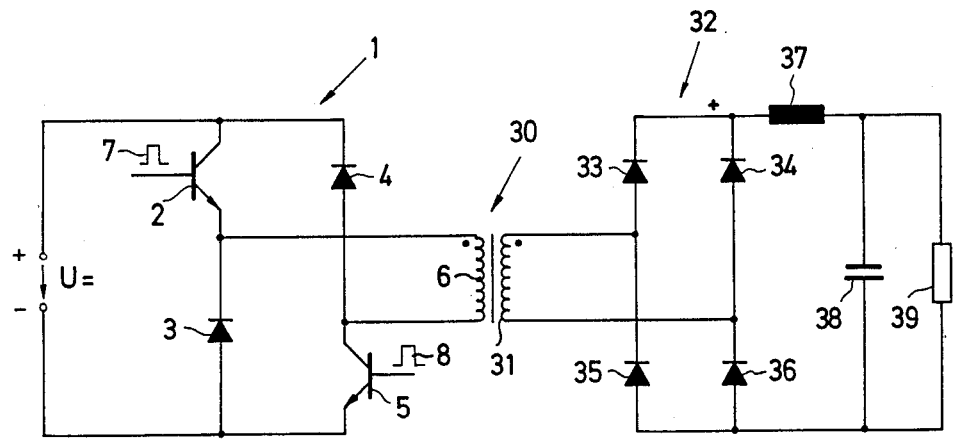
FIG.3
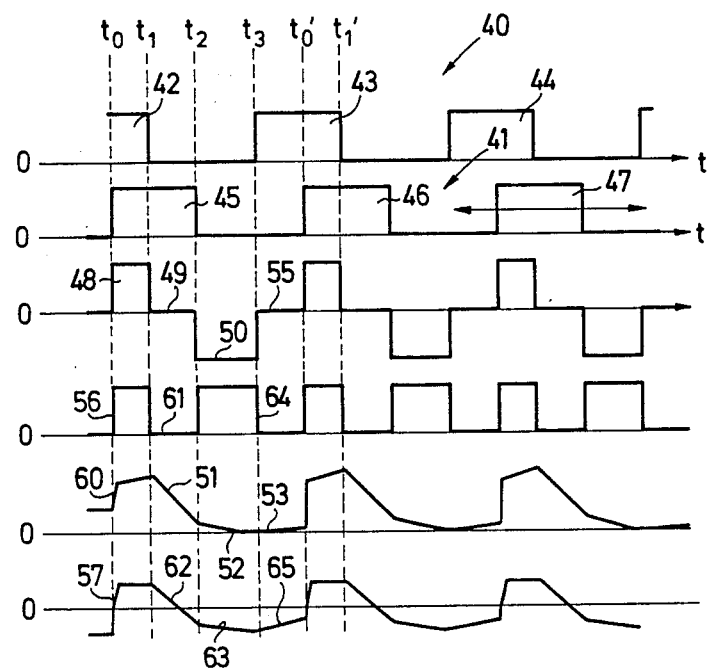
FIG.4a
FIG.4b
FIG.4c
FIG.4d
FIG.4e
FIG.4f

D.C.-A.C. CONVERTER HAVING AN ASYMMETRIC HALF-BRIDGE CIRCUIT

The invention relates to a d.c.-a.c. converter having an asymmetric half-bridge circuit that has an energy-storing component.

In order to operate electrical d.c. loads from an a.c. or three-phase current mains supply there are generally used controllable rectifier circuits with adaptive transformers and downstream filters. The overall size of these adaptive transformers and filters is, however, relatively large in the case of a 50 Hz mains a.c. voltage, for which reason there are used high-frequency choppers of, for example, 20 kHz, of which the output a.c. voltage is rectified; it is also possible, by means of pulse-width modulation, to produce a variable d.c. voltage from a fixed d.c. voltage from the mains supply. As choppers there are used either asymmetric half-bridge circuits or symmetric full-bridge circuits in conjunction with low-leakage transformers (see Thomson CSF, Handbuch II, 'Transistor in der Leistungselektronik', Chapter XIII, Joel Redouty, Grundlagen für die Entwicklung eines Schaltnetzteils für den Betrieb am 380 V-Netz, pages 225–241). These two converter circuits exhibit fundamentally different behaviour. The reason for this lies in the fact that the full-bridge circuit is a symmetric converter in which the magnetic flux is bipolar. The magnetic operating point in this case describes a cycle that is symmetric with respect to the zero point, and the mean value of the flux in the core is equal to zero.

The half-bridge circuit operates asymmetrically, that is to say the magnetic flux is unipolar, because the magnetic operating point or the magnetic flux describes a cycle in only one quadrant and the mean value of the flux is not equal to zero. For this reason, in an asymmetric converter the transformer is magnetised in the energy-transfer phase, which requires an additional demagnetisation phase in which no energy is transferred. As a consequence, in an asymmetric converter, a transfer of energy can take place only during a portion of the cycle, for example a maximum of 50%. In a d.c.-d.c. conversion, therefore, only a half-wave rectifier circuit, and not a full-wave rectifier circuit, is connected to the output of an asymmetric converter.

Although the symmetric converter seems to have decisive advantages over the asymmetric converter, in practice the asymmetric converter is nevertheless often preferred because a symmetric converter never operates completely symmetrically and therefore requires expensive symmetry correction circuits. In addition, the transformer must be designed to be larger than its theoretical dimensions, in order to avoid undesired saturation.

A regulated d.c.-d.c. voltage converter which uses a high-frequency connection is already known (Ranganathan, Ziogas and Stefanovich: A regulated DC-DC Voltage Source Converter Using a High Frequency Link, IEEE Transactions on Industry Applications, Vol. IA-18, No. 3, May/June 1982, pages 279–287). This high-frequency connection has a half-bridge circuit having two thyristors and two diodes, which chops a d.c. voltage. The chopped voltage is then supplied via a transformer to a full-wave rectifier bridge. The regulation of the voltage is effected by altering the frequency with which the thyristors of the half-bridge circuit are fired. A special oscillation circuit is also provided.

A stabilised high-voltage source is also known which has an asymmetric half-bridge circuit with a transformer as load, the secondary side of this transformer being connected to a full-bridge circuit (Japanese Published Specification No. 59-17869). This stabilised high-voltage source has a regulated voltage source of relatively small capacity which is connected in series with a conventional, unregulated three-phase full-wave voltage source. The driving of the transistors of the stabilised voltage source. The driving of the transistors of the stabilised voltage source is effected in conventional manner, that is to say the two transistors are driven simultaneously and by pulses having the same pulse wave form in each case. Only the width of the pulses can be altered in order to achieve a kind of pulse-width modulation.

The problem underlying the invention is to combine the advantages of a full-bridge chopper circuit with the advantages of a half-bridge chopper circuit.

This problem is solved by the controllable switching means of the half-bridge circuit, being driven by means of phase-shifted control pulses of substantially 180 electrical degrees, the control pulses at least partly overlapping in time.

The advantage achieved by the invention lies particularly in the fact that quasi-symmetrical operation is possible notwithstanding the use of an asymmetric half-bridge chopper circuit. In contrast to conventional asymmetric half-bridge circuits, the transfer of energy takes place not only during a maximum of 50% of a cycle but over a maximum of the entire cycle. In contrast to known circuit arrangements, the control pulses of the circuit arrangement according to the invention are always of the same width. The modulation effect is therefore achieved through different degrees of overlapping.

In comparison with the conventional asymmetric half-bridge with half-wave rectification, when the number of pulses is doubled the output voltage is increased to its double. This represents a reduced requirement for smoothing the output voltage in the circuit according to the invention. In the case of half-wave rectification, however, the step-up ratio of the transformer must be twice as large as in the case of full-wave rectification, so that the diodes must be designed for twice the cut-off voltage. The unipolar magnetic flux in the transformer generated by the half-bridge means that the transformer must be of correspondingly large dimensions. As a result of the premagnetisation of the transformer, it is possible for it to be dimensioned as in the case of a bipolar magnetic flux.

Embodiments of the invention are shown in the drawings and are described in detail in the following:

FIG. 1 shows an asymmetric bridge circuit having active switching elements for converting a d.c. voltage into a.c. voltage;

FIG. 2a shows conventional driving of the transistor 2 in the circuit according to FIG. 1;

FIG. 2b shows conventional driving of the transistor 5 in the circuit according to FIG. 1;

FIG. 2c shows the idealised voltage curve at the inductor 6 of the circuit according to FIG. 1;

FIG. 2d shows the idealised course of current through the inductor 6 of the circuit according to FIG. 1;

FIG. 3 shows an asymmetric bridge circuit according to the invention of which the output is fed via a transformer to a full-wave rectifier;

FIG. 4a shows the driving according to the invention of the transistor 2 in the circuit according to FIG. 3;

FIG. 4b shows the driving according to the invention of the transistor 5 in the circuit according to FIG. 3;

FIG. 4c shows the idealised voltage curve on the secondary side of the transformer in the circuit according to FIG. 3;

FIG. 4d shows the voltage curve of the voltage rectified by the secondary-side rectifier of the circuit according to FIG. 3;

FIG. 4e shows the course of the primary current in the transformer of the circuit according to FIG. 3;

FIG. 4f shows the course of the secondary current in the transformer of the circuit according to FIG. 3;

Figure 5:
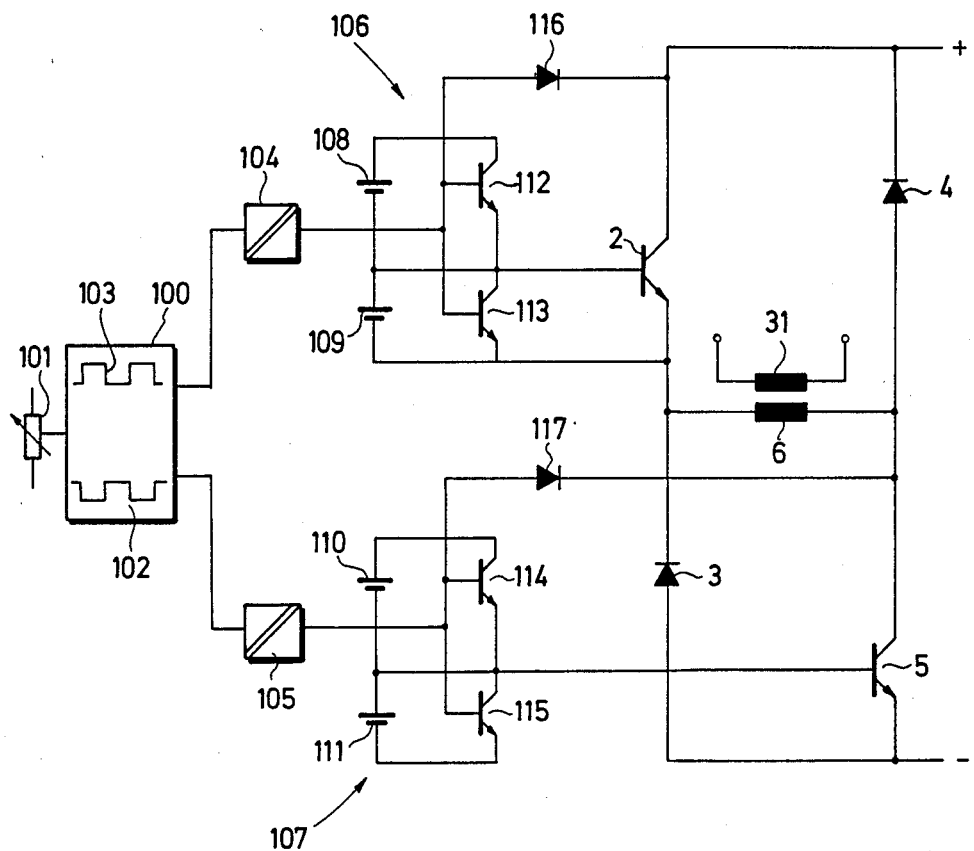
FIG. 5 shows the circuit arrangement according to the invention with the associated drive unit.

FIG. 1 shows an asymmetric bridge circuit or a chopper 1 for the conversion of a d.c. voltage $U_=$ into an a.c. voltage $U_\sim$. This bridge circuit 1 is known as such and contains in parallel with the d.c. voltage $U_=$ a first shunt arm which consists of a transistor 2 and a diode 3. In parallel with this first shunt arm there is connected a second shunt arm with a diode 4 and a transistor 5 in series with the latter. The collector of the transistor 2 of the first shunt arm is connected to the positive pole of the d.c. voltage $U_=$, whilst the negative pole of the d.c. voltage $U_=$ is connected to the anode of the diode 3 of the first shunt arm. The cathode of this diode 3 is connected to the emitter of transistor 2. The diode 4 and the transistor 5 are differently connected in the second shunt arm. Here the cathode of diode 4 is connected to the positive pole of the d.c. voltage $U_=$, whilst the emitter of transistor 5 is connected to the negative pole of the d.c. voltage. The anode of diode 4 is in this case connected to the collector of transistor 5.

In addition, between the emitter of transistor 2 and the collector of transistor 5 there is connected an inductor 6 across which an a.c. voltage $U_\sim$ drops.

The driving pulses, which are given to the bases of the transistors 2, 5, are shown symbolically in FIG. 1 and are indicated by the reference numerals 7 and 8, respectively.

These driving pulses 7, 8 are shown again in FIGS. 2a and 2b, their phase relationship being conventional. It will be seen that the driving pulses 7 for transistor 2, of which only three individual pulses 9, 10, 11 are shown, are in phase with the driving pulses 8 for transistor 5, of which again only three individual pulses, 12, 13, 14 are shown. The individual pulses 9, 10, 11 have the same height, width and phase relationship as the individual pulses 12, 13, 14. Although it is possible to alter the width of pulses 7 and 8 in order to achieve a kind of pulse-width modulation, this alteration is effected in the same way for both pulses 7 and 8. If the transistors 2 and 5 are driven by the said pulses, an idealised voltage curve is produced at the inductor 6, as shown by reference numeral 15 in FIG. 2c. The turning on of the transistors 2, 5 takes place simultaneously at time $t_0$ so that a current can flow via transistor 2, inductor 6 and transistor 5, which current builds up at inductor 6 the positive voltage 16 shown in FIG. 2. At time $t_1$ both transistors 2, 5 are cut off by pulses 9, 12, that is to say current can no longer flow via the path 2-6-5, so that it is also no longer possible for a positive voltage to build up at the inductor. The magnetic energy that is stored in inductor 6 at this time is drained via the diodes 3 and 4, so that a negative voltage 17 is produced at the inductor 6. The idealised course of current through inductor 6 is shown by the reference numeral 18 in FIG. 2d. It will be seen that when the transistors 2, 5 are turned on, the current increases sharply to point 19 and then, during the conducting phase of the transistors 2, 5, increases only by its magnetisation current to point 20. If the transistors 2, 5 are cut off, the current falls sharply to point 21, and then, during the cut-off phase of the transistors 2, 5, falls only slightly to point 22 in order to drain the magnetisation current by way of the diodes 3, 4.

A particular characteristic feature of conventional driving is that the voltage curve at the inductor 6—which can also be interpreted as the primary side of a transformer the secondary side of which feeds a half-wave rectifier bridge circuit—has positive and negative half-waves, the positive half-waves 16, 16' occurring during the driving of the transistors 2, 5, whilst the negative half-waves 17, 17' occur during the cut-off phases of the transistors 2, 5. An analogous voltage curve is produced on the secondary side of a transformer if the inductor 6 represents the primary side of that transformer. If the transistors 2, 5 are turned on, a positive voltage is applied to the transformer coil. The transformer is magnetised as a result. During the period in which the two transistors are switched off, however, a negative voltage is applied to the transformer coil, that is to say the transformer is demagnetised. In conventional pulse-width modulation this means that there is always only a positive or a negative voltage applied to the transformer. When the pulse width is altered, the positive or negative portion of the voltage is consequently displaced via the transformer. If this voltage component is rectified, a linear voltage curve is not obtained when the output voltage is controlled.

FIG. 3 shows a circuit arrangement according to the invention in which elements that correspond to elements in FIG. 1 have the same reference numerals. The inductor 6 is here used as the primary coil of a transformer 30 of which the secondary coil 31 is connected to a full-wave rectifier 32 which has four diodes 33, 34, 35, 36. The secondary coil 31 is connected, at one terminal to the connection between the anode of the diode 33 and the cathode of the diode 35 and, at the other terminal, to the connection between the anode of the diode 34 and the cathode of the diode 36. The full-wave rectifier 32 is connected to a filter having a longitudinal inductor 37 and a shunt capacitor 38, a load 39 being located in parallel with this shunt capacitor 38.

FIGS. 4a–4f show the driving pulses and output values according to the invention that occur in the circuit arrangement according to FIG. 3. The transistors 2 and 5 are here driven by pulses which can be phase-shifted relative to one another by up to 180°. These pulses are indicated by the reference numerals 40 and 41, respectively, and have, for example, the individual pulses 42, 43, 44 and 45, 46, 47, respectively. The pulses 42–44 and 45–47 have a pulse width of 180 electrical degrees. Because the properties of the components used, for example the final circuit-commutated recovery times of the transistors or the magnetisation of the transformer, are not ideal, it is very difficult in practice to obtain exactly 180°, so that the pulses in FIGS. 4a, 4b are shown as somewhat smaller. Under ideal circumstances, however, the gaps between the pulses correspond to the pulse widths. When determining the phase displacement between the pulses 40, 41 according to the invention, care should be taken that the period $t_1-t_0$ in which the transistors 2, 5 are simultaneously conducting is shorter than the cut-off period that is necessary for the complete demagnetisation of the transformer 30. If it is assumed that transistor 2 is already turned on at time $t_0$ when, at time $t_0$, transistor 5 is turned on, then at time $t_0$ a current 60 flows through transistor 2 and via the primary coil 6 of the transformer 30 also through transistor 5. At the primary coil 6 a positive voltage 48 builds up which remains until time $t_1$. At this time $t_1$ the transistor 2 is cut off. The current 51 can then, however, still continue to flow—via transistor 5 and diode 3. The voltage over the primary coil 6 of the transformer 30 is therefore short-circuited through transistor 5 and diode 3, that is to say the voltage is at zero between $t_1$ and $t_2$, as shown by the reference numeral 49. At time $t_2$, transistor 5 is also cut off, so that the magnetic energy contained in the primary side 6 can be drained only via the diodes 3, 4. The demagnetisation current 52 consequently flows back into the d.c. voltage source $U_=$. During the demagnetisation of the transformer 30, the voltage 50 at the primary side of this transformer 30 is negative. At time $t_3$, the transistor 2 is turned on and the current 53 flows via diode 4 and transistor 2 through the primary coil 6. During the period $t_3-t_0'$ this primary coil 6 is short-circuited, so that the voltage 55 at coil 6 is at zero. The conditions with regard to the secondary side 31 of the transformer 30 should now be considered. At time $t_0$ a positive voltage 56 is applied to the secondary coil 31 of the transformer 30. The secondary current 57 flows via the diode 33, the smoothing choke 37, the load 39 and via diode 36 through the secondary oil 31 of the transformer 30. At time $t_1$ the voltage 61 applied to the secondary coil 31 is zero, whilst the current in the smoothing choke 37 freewheels via the rectifier arrangement 33, 35, 34, 36. As a result, the secondary coil 31 is short-circuited, the current 62 being able to continue to flow through it.

At time $t_2$ the voltage and the current in the secondary coil 31 reverse. The current 63 then flows via diode 34, the smoothing choke 37, the load resistor 39 and diode 35 in the secondary coil 31.

At time $t_3$ the voltage 64 in the secondary coil 31 again becomes zero. The current through the smoothing choke 37 freewheels via the rectifier arrangement 33, 35, 34, 36; the secondary coil 31 is consequently short-circuited, the current 65 in this secondary coil continuing to flow.

This is true of the primary and secondary sides of the transformer 30 until the two transistors 2 and 5 turn on and off at the same point in time as a result of the phase displacement of the driving pulses. If this is the case, the conditions that were described in connection with FIGS. 1 and 2 then prevail again.

FIG. 5 shows the asymmetric half-bridge circuit according to the invention with the associated drive circuit. This drive circuit has a pulse displacement circuit 100 upstream of which there is connected a variable resistor 101 with which it is possible to effect pulse displacement of from 0° to 180°. The lower pulses 102 are displaced relative to the upper pulses 103. Each of the two outputs of the pulse displacement circuit 100 is associated with a potential separator 104, 105 each of which is connected to a driver unit 106, 107, respectively. Each of these driver units 106, 107 consists essentially of two d.c. voltage sources 108, 109; 110, 111 and two transistors 112, 113; 114, 115, the bases of the transistors 112, 113 and 114, 115 being connected together and being connected to the potential separator 104, 105 respectively and via a diode 116, 117, for the purpose of quasi-saturation, to the collector of transistor 2 or 5, respectively. The bases of the transistors 2 and 5 are connected to the junction between two transistors 112, 113 and 114, 115 of a driver stage 106, 107 and to the junction between the two d.c. voltage sources 108, 109 and 110, 111, respectively.

It will be understood that the pulse displacement can be effected in many ways. It is thus possible not only to displace pulses 102 relative to the fixed pulses 103, but also to hold pulses 102 steady and displace pulses 103. It is also possible to displace the two pulses 102, 103 simultaneously and relative to one another.

Relief networks, which can be provided in the case of the transistors 2, 5, are not shown, since such networks are already known (see Boehringer/Knöll: 'Die Entlastung des Transistors von überhöhter Verlustleistungsbeanspruchung beim Ausschalten, etc.' Vol 100, 1979, No. 13, pages 666–669, DE-AS No. 1,168,962).

Although the overlapping of the two control pulses can be regulated between 0% and 100%, in practice 0% and 100% are merely limiting cases.

Figure 6:
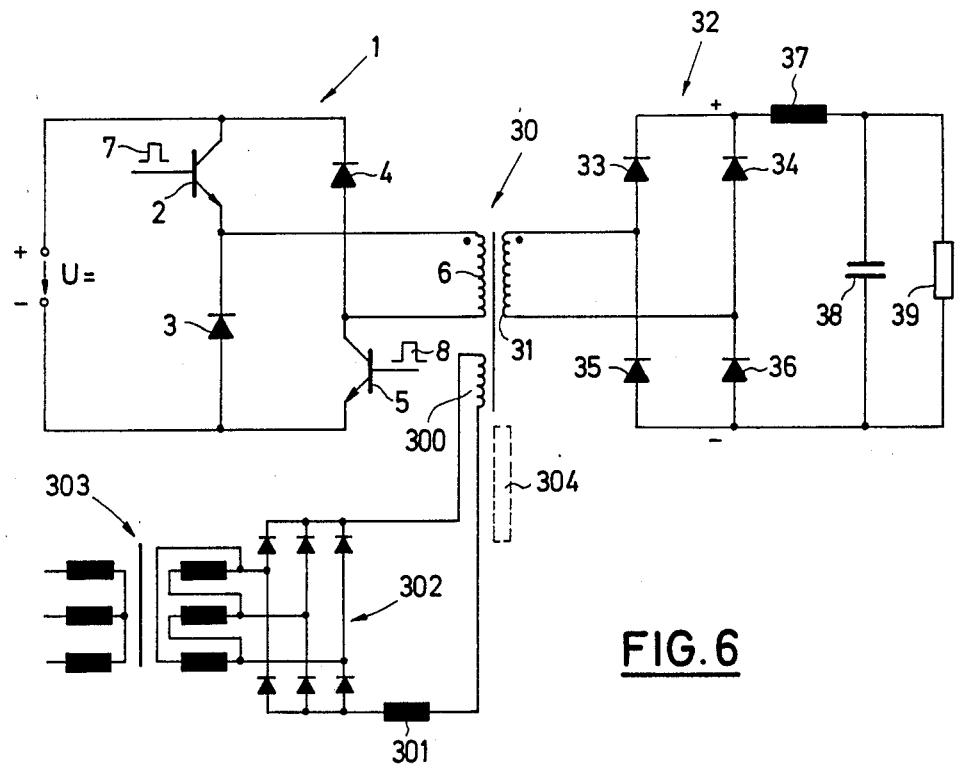
FIG. 6 shows a premagnetisation device.

FIG. 6 shows a circuit arrangement which improves the transformation behaviour of the transformer 30 for the energy pulse to be transferred. As a result of the half-bridge circuit 1, only one loop of the characteristic magnetisation curve, the so-called B-H curve, will traverse through the transformer 30, which represents unfavourable utilisation of the transformer. By means of a corresponding premagnetisation device that is oppositely poled in terms of flux, the entire—negative and positive—characteristic magnetisation curve will traverse through. This premagnetisation device either consists of a three-phase current transformer 303 with a downstream three-phase current bridge circuit 302 and a current-limiting choke 301, which extensively suppresses the flow of an induced alternating current in this circuit, or consists of a permanent magnet, or of a combination of the two.

We claim:

1. A d.c.-a.c. converter comprising:
   an asymmetric half-bridge circuit having first and second branches, said branches each comprising a controllable switching means connected to a rectifier means, said controllable switching means in each of said branches being connected to said rectifier means in the other of said branches, and
   an energy storage means having two terminals, each of which is connected between said rectifier means and said controllable switching means of one of said branches,
   said controllable switching means driven by phase-shifted control pulses of substantially 180° pulse width, said control pulses partly overlapping in time.

2. A d.c.-a.c. converter as in claim 1, where said overlapping of said pulses can be regulated between 0 and 100%.

3. A d.c.-a.c. converter as in claim 1, wherein said branches are connected in parallel to a d.c. voltage supply.

4. A d.c.-a.c. converter as in claim 3, where said rectifier means are diodes and said controllable switching means are transistors, a cathode of said diode in said second branch being connected to a collector of said transistor in said first branch and an anode of said diode in said first branch being connected to an emitter of said transistor in said second branch.

5. A d.c.-a.c. converter as in claim 4, where said transistors are provided with relief networks.

6. A d.c.-a.c. converter as in claim 3, where said control pulses for said controllable switching means in one of said branches is fixed, whilst said control pulses for said controllable switching means in the other of said branches is displaced.

7. A d.c.-a.c. converter as in claim 1, where said energy storage means is an inductor.

8. A d.c.-a.c. converter as in claim 7, where said inductor is the primary side of a transformer.

9. A d.c.-a.c. converter as in claim 8, where said transformer has a secondary side connected to a second rectifier means thereby forming a d.c.-d.c. converter.

10. A d.c.-a.c. converter as in claim 9, where said second rectifier means is a full-wave rectifier circuit.

11. A d.c.-a.c. converter as in claim 9, where a filter is connected downstream of said second rectifier means.

12. A d.c.-a.c. converter as in claim 11, where a load is connected downstream of said filter.

13. A d.c.-d.c. converter comprising:
an asymmetric half-bridge circuit having first and second branches, said branches each comprising a controllable switching means connected to a rectifier means, said controllable switching means in one of said branches being connected to said rectifier means in the other of said branches,
an energy storage means having two terminals, each of which is connected between said rectifier means and said controllable switching means of one of said branches, and
a full-bridge rectifier circuit, which is connected to the output of said energy storage means,
said controllable switching means are driven by phase-shifted control pulses, said control pulses partly overlapping in time.

14. A d.c.-d.c. converter as in claim 13, where said energy storage means is an inductor.

15. A d.c.-d.c. converter as in claim 13, where said energy storage means is a transformer.

16. A d.c.-a.c. converter as in claim 8 or 15, where an additional coil, which is premagnetised with direct current via a three-phase current bridge circuit, is coupled with said primary side of said transformer.

17. A d.c.-a.c. converter as in claim 16, where a choke, which suppresses an alternating flow, is connected between said additional coil and said three-phase current bridge circuit.

18. A d.c.-a.c. converter as in claim 16, where the premagnetisation flux in said transformer is opposed to the flux of the energy pulse to be transformed.

19. A d.c.-a.c. converter as in claim 16 or 15, where permanent magnets for producing said premagnetisation are incorporated into the magnetic circuit of said transformer.

20. A d.c.-a.c. converter as in claim 19, where the flux of said permanent magnets is opposed to the flux of the energy pulse to be transformed.

21. A d.c.-a.c. converter as in claim 19, where premagnetisation produced electrically and said premagnetisation produced by said permanent magnets are used together.

* * * * *